United States Patent Office 3,697,232
Patented Oct. 10, 1972

3,697,232
PREPARATION OF POTASSIUM
CYANOBOROHYDRIDE
Robert C. Wade, Ipswich, Mass., assignor to
Ventron Corporation, Beverly, Mass.
No Drawing. Filed June 16, 1969, Ser. No. 833,766
Int. Cl. C01b 6/14, 35/00; C01c 3/08
U.S. Cl. 23—358                   1 Claim

ABSTRACT OF THE DISCLOSURE

The invention relates to the preparation of potassium cyanoborohydride. This compound is prepared by mixing substantially anhydrous hydrogen cyanide with a substantially anhydrous potassium borohydride at a temperature between 0° C. and 100° C. in substantially anhydrous dimethylformamide at atmospheric pressure. If desired to avoid loss of hydrogen cyanide, a pressure of from about 1 to 5 pounds per square inch may be used. Preferably, the preparation is carried out in two stages (1) initially at a temperature between about 10° C. to about 35° C. until substantially all hydrogen has ceased to be evolved, and (2) then at a temperature between about 35° C. and the boiling point of the solvent until all the intermediate products have been converted to the desired cyanoborohydride.

---

This invention relates to the preparation of potassium cyanoborohydride.

The synthesis of lithium cyanoborohydride was reported by G. Wittig and P. Rolff in Annalan 573, pages 202, 209 (1951). They reacted an excess of hydrocyanic acid with lithium borohydride in diethyl ether at 100° C. and 500 p.s.i. pressure.

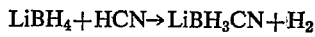

They found that this product reacted with dioxane to form a bisdioxanate $LiBH_3CN \cdot 2C_4H_8O_2$. Upon vacuum drying this product one mole of dioxane is removed to give $LiBH_3CN \cdot C_4H_8O_2$.

As far as I am aware, there is no publication describing the preparation of the other alkali metal or quaternary ammonium cyanoborohydrides. These probably would not be prepared by the Wittig et al. method because of the insolubility of $NaBH_4$ and $KBH_4$ in ether. Neither are there any references in the literature of the products $NaBH_3CN$, $KBH_3CN$ or $R_4NBH_3CN$ or their ether complexes that I am aware of.

I have discovered that hydrogen cyanide reacts with potassium borohydride at atmospheric pressure in dimethylformamide at a temperature between 0° and 100° C. to form potassium cyanoborohydride. The reaction appears to take place in two stages. Thus, if the reaction mixture is heated initially to between about 10° and about 35° C. until hydrogen ceases to be evolved, an intermediate product is formed which is hydrolyzed by water or weak aqueous acid solutions. In the second stage, the reaction mixture is heated at to between 35° and the boiling point of the solvent until the intermediate product has been converted to the desired cyanoborohydride ($KBH_3CN$). The final product is stable in water.

If temperatures higher than about 35° C. are used in the first stage of the reaction some hydrogen cyanide is lost by evaporation and is swept out of the reaction zone by the evolving hydrogen. Loss of hydrogen cyanide can be overcome by applying a slight pressure of about 1 to 5 pounds per square inch to the system but this is not necessary when operating in the preferred range in the first stage of the reaction. Since all the hydrogen cyanide has been reacted during the first stage none can be lost during the second stage which is carried out at 35° C. up to the boiling point of the solvent.

The starting materials should be an anhydrous as possible because water, in the presence of even weak acid, such as hydrogen cyanide, can cause hydrolysis of the starting borohydride and intermediate products. The final product, cyanoborohydride, does not hydrolyze under these conditions.

The final product is more soluble in the reaction solvent than the starting borohydride and is soluble in water. It is highly solvated. These solutions are useful for many applications, such as organic reductions. Excess solvents can be removed by solvent evaporation to yield solid products containing from almost none of the solvent to up to 1 mole of the solvent per mole of the cyanoborohydride.

The invention is illustrated further by the following specific examples.

EXAMPLE 1

5.4 g. (0.1 mole) $KBH_4$ was suspended in 100 ml. THF. There is no solubility of $KBH_4$ in THF. Then 0.1 mole HCN dissolved in THF to give a 20% solution was added over a period of 30 minutes. No temperature rise occurred and only 0.05 liter of $H_2$ was evolved. The reaction mixture was heated to 64° C. for 3 hours. No further evolution of $H_2$ occurred. The reaction mixture became dark orange color indicating some polymerization of HCN occurred. $KBH_4$ does not react with HCN under these conditions.

EXAMPLE 2

5.4 g. (0.1 mole) of $KBH_4$ was suspended and dissolved in 100 ml. of dimethylformamide. Then 13.5 g. of a solution containing 20% HCN in dimethylformamide was added dropwise to the $KBH_4$ solution-suspension over a period of 15 minutes at a temperature of 22–25° C. A slow reaction occurred with the evolution of hydrogen. The solution turned a dark brown color. The temperature was raised to 35° C. before the reaction stopped. A total of 1.9 liters of hydrogen were evolved. Theoretical was 2.2 liters indicating that 87% of the $KBH_4$ had been reacted to form $KBH_3CN$.

I claim:
1. The process which comprises contacting substantially anhydrous hydrogen cyanide with a substantially anhydrous potassium borohydride in substantially anhydrous dimethylformamide at a temperature between about 10° C. and about 35° C. until substantially all hydrogen has ceased to be evolved then heating the reaction mixture to between 35° and the boiling point of the solvent until all intermediate products have been converted to the desired potassium cyanoborohydride ($KBH_3CN$).

References Cited

UNITED STATES PATENTS 2,992,885    7/1961    Jackson et al.          23—358
3,330,628    7/1967    Johns                23—358

OTHER REFERENCES

Adams et al.: "Boron, Metallo-Boron Compounds and Boranes," 1964, p. 386.
Wittig et al.: "Annalan," vol. 573, pp. 202, 209 (1951).

MILTON WEISSMAN, Primary Examiner

U.S. Cl. X.R.

27—79, 361